United States Patent [19]

Conley

[11] Patent Number: 4,522,529
[45] Date of Patent: Jun. 11, 1985

[54] PRE-STRESSED FIBER-RESIN SUCKER ROD AND METHOD OF MAKING SAME

[76] Inventor: Edwin E. Conley, P. O. Box 14090, Tulsa, Okla. 74104

[21] Appl. No.: 444,684

[22] Filed: Nov. 26, 1982

Related U.S. Application Data

[63] Continuation-in-part of Ser. No. 320,463, Nov. 12, 1981.

[51] Int. Cl.³ ............................................. E21B 17/00
[52] U.S. Cl. .................................... 403/343; 403/265
[58] Field of Search ............... 403/343, 265, 266, 299; 428/245, 260; 156/160, 161

[56] References Cited

U.S. PATENT DOCUMENTS

| | | | |
|---|---|---|---|
| 2,827,414 | 3/1958 | Bussard et al. | 156/160 X |
| 4,063,838 | 12/1977 | Michael | 403/343 |
| 4,155,791 | 5/1979 | Higuchi | 156/161 |
| 4,205,926 | 6/1980 | Carlson | 403/343 |

FOREIGN PATENT DOCUMENTS

| | | | |
|---|---|---|---|
| 2037923 | 7/1980 | United Kingdom | 403/343 |
| 2075625 | 11/1981 | United Kingdom | 403/343 |
| 2100818 | 1/1983 | United Kingdom | 403/343 |

Primary Examiner—Andrew V. Kundrat
Attorney, Agent, or Firm—Head, Johnson & Stevenson

[57] ABSTRACT

A sucker rod used in pumping liquids from subterranean oil or water wells is formed of plastic material having pre-stressed reinforcing fiber strands or roving therein, and a method of manufacturing same.

3 Claims, 14 Drawing Figures

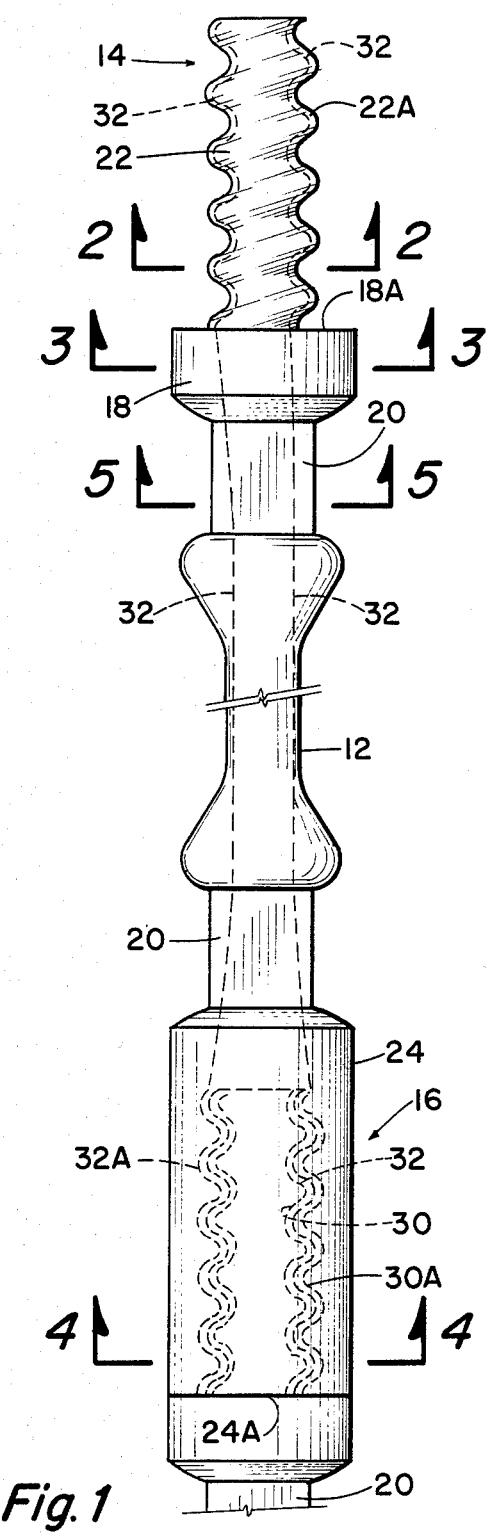
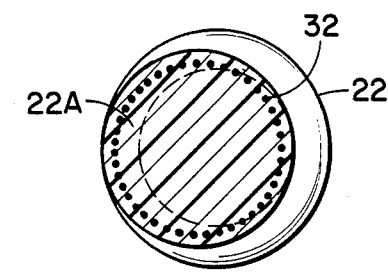
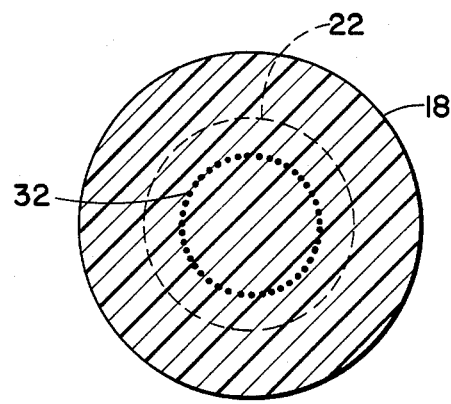
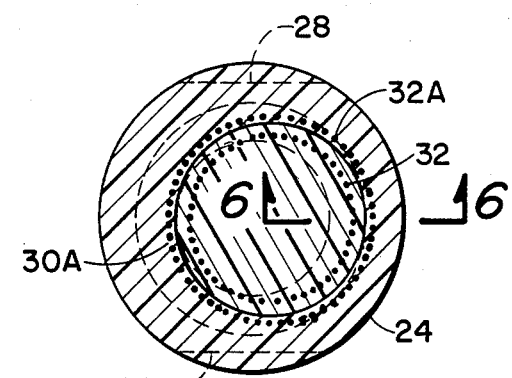
U.S. Patent Jun. 11, 1985 Sheet 1 of 5 4,522,529
Fig. 1
Fig. 2
Fig. 3
Fig. 4

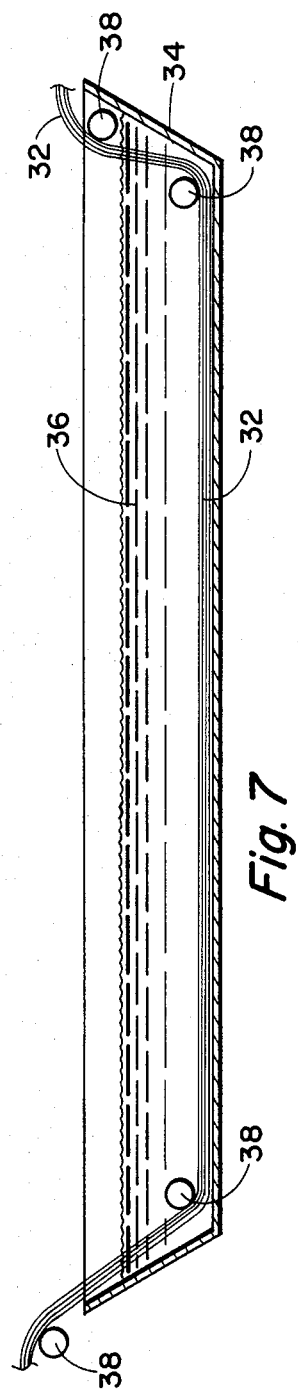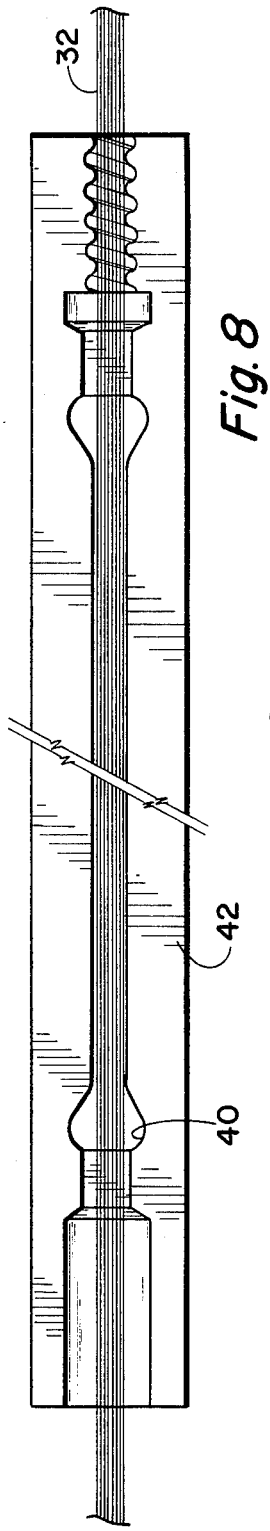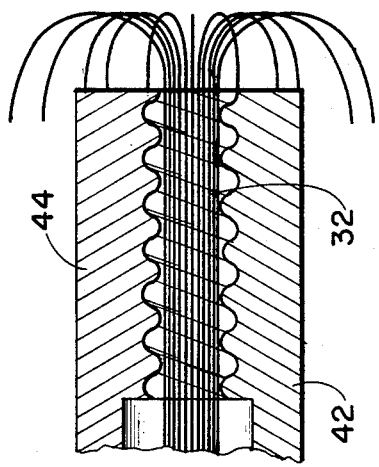

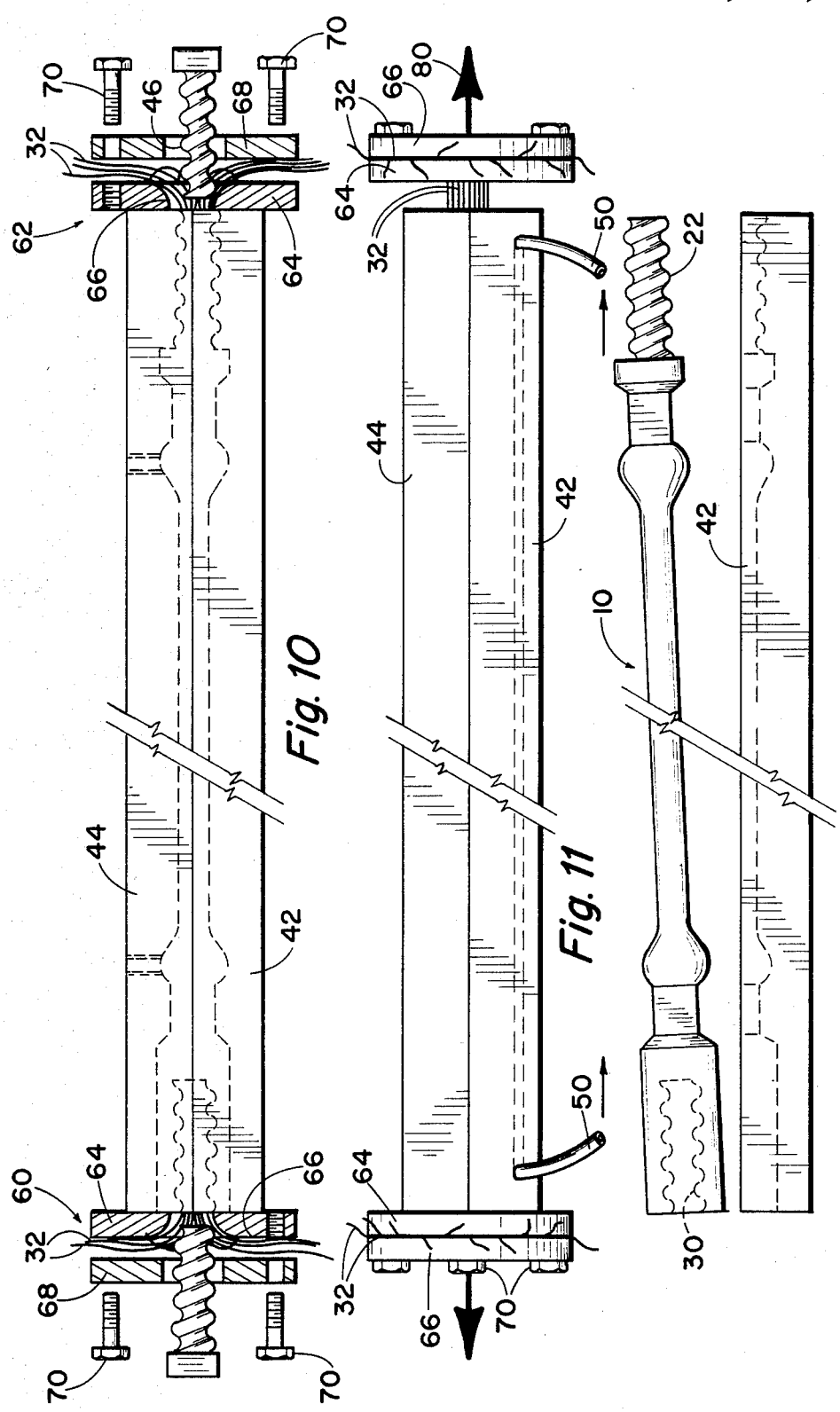

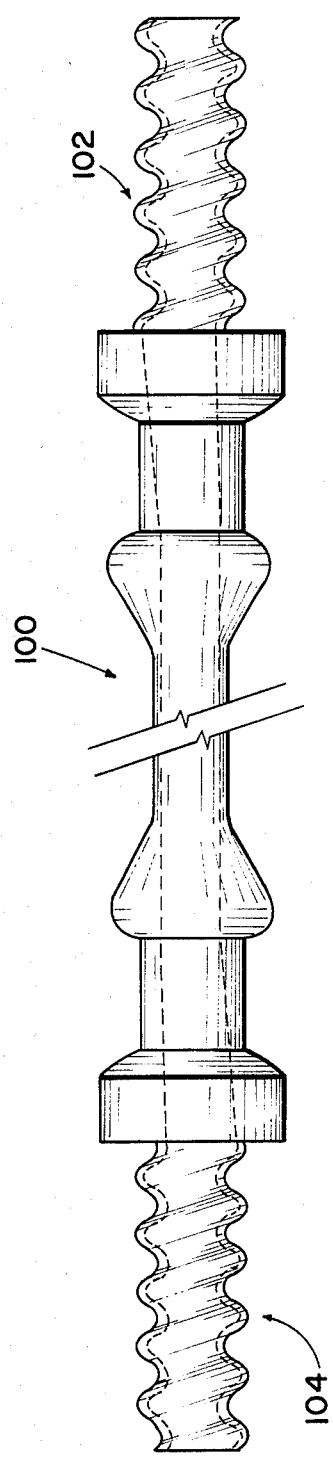
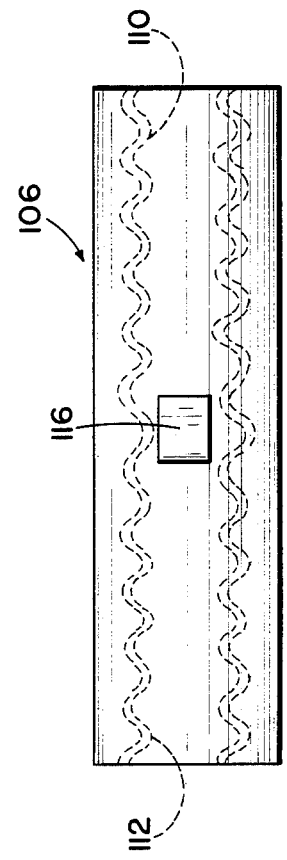
Fig. 13
Fig. 14

PRE-STRESSED FIBER-RESIN SUCKER ROD AND METHOD OF MAKING SAME

CROSS-REFERENCE TO RELATED APPLICATION

This application is a continuation in part of Ser. No. 320,463 filed Nov. 12, 1981 for "FIBER REINFORCED RESIN SUCKER ROD AND METHOD OF MAKING SAME".

BACKGROUND OF THE INVENTION

1. Field of the Invention

This invention relates to an improved sucker rod made of plastic materials, and more particularly, to a fiber reinforced plastic sucker rod in which the threads at each end of the sucker rod are of increased strength, the fibers being continuous through the apex portion of the threads, and to a method of manufacturing such improved sucker rod, and couplings used therewith.

2. Description of the Prior Art

Steel sucker rods used to transmit power between a bottom hole reciprocating pump and above ground means to cause the reciprocation have long been used in the production of oil or other fluids from subterranean wells, and are now standard in diameters, length and joints.

Fiber reinforced sucker rods have been manufactured for some time, but because of limitations in existing products, they have not been universally employed in the petroleum industry. Attempts to manufacture fiber reinforced sucker rods with integral internal and external threads with strength equal to the rod body have been unsuccessful. Furthermore, it is not practical to machine a thread into a resin fiberglass laminated sucker rod or other types of fiber reinforced sucker rods because machining cuts the reinforcing fibers and weakens the structures to such an extent that in use the threads break, thus being of no value as a coupler.

To overcome this problem, others have employed plastic and fiberglass sucker rocs having metal couplings affixed to each end of the rod. This technique has not been universally successful due to the lack of uniformity and predictability and the higher manufacturing costs. Also the metal parts can only be attached to the surface fibers of the rod which bypasses the main strength of the fiber bundle in the rod. Although, the high coefficient of friction characteristic of fiber reinforced plastic overcomes the problem of metal unthreading in service due to its low coefficient of friction, the metal fittings attached to the rod also cause increase in the weight of the rods and susceptibility to corrosion.

SUMMARY OF THE INVENTION

An object of the present invention is to overcome these difficulties and to provide a uniform fiber reinforced plastic sucker rod and coupling that is equally strong in the threads as in the main body of the rod. The sucker rod provided by this invention is characterized by lightweight and corrosion resistance, and a structure that is not susceptible to early failure by scratching or abrading the surface.

A further characteristic of the sucker rod of this invention is the provision of a method of molding and forming a rod with male and female threaded end portions wherein a preselected amount of fibers or roving are retained within the completed sucker rod in proper and substantially uniform distribution.

Another object of the present invention is to provide a method of molding a sucker rod of plastic material having continuous filaments or fibers therein in which the filaments are prestressed and carried into the apex and root portions of the threaded ends prior to setting or cure.

Another object of the invention is to provide an improved fiber reinforced plastic sucker rod in which the threaded end portions have strength substantially equal to or greater than the rod body.

A yet further object of this invention is to provide a sucker-rod of plastic material having a rounded thread for interconnection of the rods, which thread design is such to: (1) allow the sucker rod to be of the same general size, i.e. cross-sectional diameters, sizes and length equal to existing metal sucker-rods; (2) provide maximum coefficient of friction to retain interconnected parts together yet be easily assembled and disassembled by field personnel; and, (3) permit the maximum number of pre-stressed reinforcing fibers to exist in the cross-sectional configuration of the threads.

Another object of the invention is to overcome the high cost of shipping of metal rods which must be shipped on special pallets to keep the rods from touching each other. The improved fiber reinforced rod of this invention can be shipped as a banded bundle with normal shipping costs.

An improved fiber reinforced plastic sucker rod and a method of manufacturing the same is provided. The sucker rod is formed of plastic material having continuous strands of pre-stressed reinforcing fibers embedded therein, the fibers being carried within the finished sucker rod in such a way that they extend adjacent the circumferential peripheral surface of the sucker rod in the portions adjacent each end thereof so that the threads formed on the ends of the rods have uninterrupted longitudinal fibers therein providing an arrangement wherein the strength of the threads is substantially increased compared to the strength obtained in the known method of attaching metal ends to glass fiber sucker rods. In the preferred embodiment, the threads are rounded with maximum root diameter and size to achieve the objects heretofore stated.

The invention includes a method of manufacturing the improved sucker rod including the steps of first saturating flexible reinforcing fiber strands with liquid thermosetting resin, positioning the saturated fiber strands in the lower cavity of a split cavity mold, closing the mold while maintaining the fiber strands adjacent the mold cavity wall, inserting flaring tools in each end of the mold cavity to displace the strands outwardly towards the mold cavity wall in the area wherein the threads at the ends of the sucker rod are formed, adding additional resin compound to the mold, pre-stressing the fibers in tension, and curing the plastic material within the mold under heat and pressure followed by separating the mold to remove the sucker rod. The reinforcing strands are embedded in the rod and maintained in substantially continuous fashion following the contour of the rod, the root and the apex portion of the formed threads to attain equal tensile strength to the rod so formed.

These general objects as well as other and more specific objects of the invention, will be understood with reference to the attached specification and claims taken in conjunction with the drawings.

DESCRIPTION OF THE DRAWINGS

FIG. 1 is an elevational view of an improved plastic sucker rod of this invention showing the external configuration and showing the arrangement of the reinforcing fibers in dotted outline.

FIGS. 2, 3, 4 and 5 are cross-sectional views taken along the lines 2—2, 3—3 , 4—4, and 5—5 respectively of FIG. 1 showing the preferred position of reinforcing fibers in the completed sucker rod.

FIG. 7 is a diagrammatic view showing a vessel in cross-section and showing fiber strands being pulled through the vessel as a means of saturating the strands with liquid thermosetting resin.

FIG. 8 is a plan view of the lower portion of a split cavity mold for forming the sucker rod, the mold having a cavity therein defining the external configuration of the finished sucker rod, and showing the saturated fiber strands positioned in the cavity of the mold lower portion.

FIG. 9 is an enlarged cross-sectional view of one end portion of a split cavity mold wherein the bottom and top halves of the mold are joined together and showing the arrangement of the fibers within the mold in the portion thereof wherein the male threads are to be formed.

FIG. 10 is an elevational side view of the split cavity mold with the top and lower portions joined together and the mold cavity shown in dotted outline and showing the flaring tools or core members which are employed for insertion into the ends of the mold for displacing the reinforcing fibers into the areas of the mold so that they will be retained within the apex and root portions of the threads.

FIG. 11 is an external view of the mold showing a means to pre-stress the fibers and the circulation of the heating fluid therein to cure the thermosetting resin within the mold.

FIG. 12 shoes the mower portion of the mold, the top portion having been removed, and showing the completed sucker rod.

FIG. 13 is an elevational view of a modified form of the sucker rod of this invention.

FIG. 14 is an elevational view of a coupling for use with the embodiment of FIG. 13.

DETAILED DESCRIPTION OF THE PREFERRED EMBODIMENT

Figure 6:
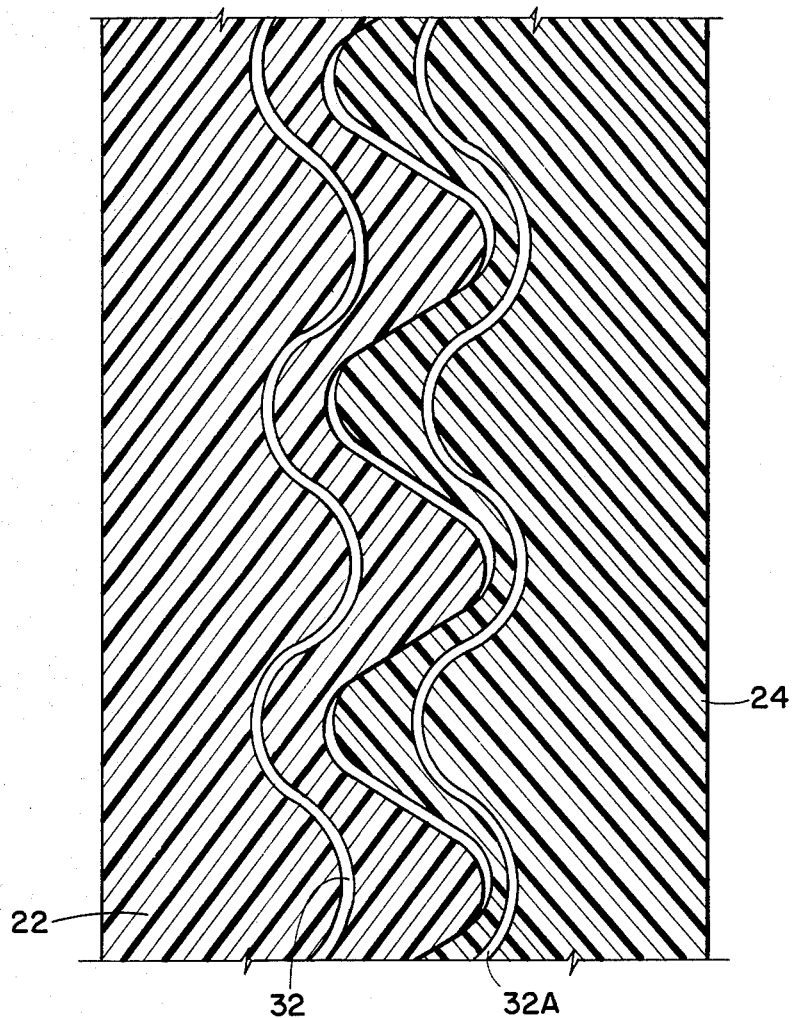
FIG. 6 is a partial section view of the threads of the sucker rod of this invention taken along the lines 6—6 of FIG. 4.

Referring to the drawings, and first to FIGS. 1 through 6, the improved plastic sucker rod of this invention is illustrated. The sucker rod, indicated generally by the numeral 10, has an external configuration similar to sucker rods which have been manufactured in the past as employed in the petroleum industry. Typically, sucker rods are 25 feet in length, with a maximum outside diameter in the area of the couplings of 1½ inches or less. The sucker rods are utilized to impart pumping motion from a pumping unit on the surface of the earth to a bottom hole pump. Thus, the sucker rods reciprocate up and down within a tubing. In order to lift a fluid column from the bottom of a well to the earth's surface to cause the fluid to be pumped to the surface, sucker rods must withstand substantial tensile loads. The most commonly employed sucker rod in the industry today is made of steel or steel alloys. However, it is subject to corrosion; and in many well conditions, steel rods have relatively short rods which are less susceptible to corrosion, but alloy sucker rods are prohibitive in price. The present invention provides a sucker rod which is substantially immune to corrosion and which has other advantages over steel or other alloy sucker rods.

The rod 10 includes a long, cylindrical, straight body portion 12. At one end is a pin end or male end, generally indicated by the numeral 14, and at the other end is a box end or female end generally indicated by the numeral 16. In this manner of construction, the rods may be threaded together without the use of separate couplings. The most common steel sucker rods have a male thread at each end with a separate female coupling used to connect rods together. The advantages of the rod of the type illustrated in FIG. 1 is that no separate coupling devices are required. However, this embodiment is not to be held as limiting this invention as the rod can be molded with a male thread at each end with a separately molded female coupling 16 used to interconnect the rods as shown in FIGS. 13 and 14.

Figure 5:
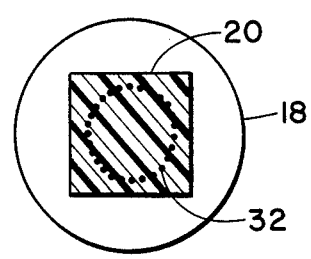

The male end 14 generally includes an enlarged head or flange portion 18 with a planar annular surface 18A which is perpendicular to the longitudinal axis of the rod as a seat for the female coupling. Wrench flats 20 as shown in FIG. 5 provide means for engaging the end of the rod with a standard rod wrench so that it may be tightened to a coupling and an adjacent rod.

Forwardly of the head portion 18 is a male portion 22 having round or "Knuckle" type threads on the exterior surface. A partial section view of a preferred form of threads is shown in FIG. 6. In one embodiment the pitch of the threads is 0.500" while the depth is 3/16".

The female end 16 includes an enlarged external diameter section 24. The female end may include the provision of opposed rod-wrench flats on the opposite side of the enlarged cylindrical portion 24.

Within the interior of the cylindrical portion 24 are internal threads 30 which are configured to receive the male threads of a next adjacent length of sucker rod. The end surface 24A is annular and in a plane perpendicular the longitudinal axis of the sucker rod. When a male threaded end of the next adjacent sucker rod is threaded into the box end 16, the male annular surface 18A tightly abuts the female annular surface 24A to ensure that no "play" exists in the threaded joint formed in securing one rod to another.

The sucker rod described up to this point is not unlike the outward appearance of metal sucker rods previously known. An important and distinctive feature, however, of the sucker rod of this invention is that it is formed of non-metallic material, that is, plastic material, and most importantly, is imbued with increased strength by the provision of longitudinal flexible reinforcing fiber strands 32 indicated by the dotted lines in FIG. 1 through 6. The result s a lightweight rod, approximately one-fifth (1/5) the weight of steel. There is little or no elongation, reduced energy consumption by above ground power source, and increased life to the well equipment. The rods of this invention provide adequate safe strength for deep well pumping. The fiber strands or roving 32 preferably extend the full length of the sucker rod, and of utmost significance to the invention is the arrangement of the fiber strands 32 so that they extend in a prestressed and tensioned condition adjacent the exterior peripheral surface of the male threads 22 and the female threads 30 of the coupling.

Specifically, the fiber strands 32 follow the contour of the threads and extend within the root and apexes of the threads which form the male threaded portion 22 and the female threaded portion 30. In this manner, the fibers are locked together into a continuous configuration of threads having equal strength to the rod body. In the past, as previously indicated, attempts to manufacture plastic sucker rods have not been highly successful since the most common employed technique has been to attach metal threaded ends to a 'pull-truded' fiber reinforced rod. Even when a large amount of reinforcing fibrous strands are utilized in formation of the sucker rod, the problem of connecting the rod with full tensile strength has remained unsolved until now.

As indicated in FIGS. 2, 4, and 6, the reinforcing fiber strands 32 are in the apex and root portions 22A of the male threads 22 and the apex and root portions 30A of the female threads 30. The fiber strands are thus concentrated adjacent the peripheral surface of the sucker rod, at least in the portions forming the male end 14 and the female end 16. It can be seen that, if desired, additional fiber strands may be positioned in the inner portions of the sucker rod, although such are not shown in the drawings. However, the essence of this invention is not simply the concept of including reinforcing strands in plastic sucker rods but including them in such a way as to substantially increase the tensile strength of the sucker rods by providing strands throughout the male and female threaded portions of the sucker rod, and preferably to provide them pre-stressed under tension prior to cure of the resin. In use, because of the high coefficient of friction of the cured resin the assembled male and female portions provide a secure connection, yet are easily assembled and disassembled using standard rod-wrenches.

Turning now to FIGS. 7-12, a method of manufacturing the improved sucker rod of this invention is schematically described. The first step is that of saturating a bundle of fiber strands with thermosetting resin as illustrated in FIG. 7. In one embodiment, a vessel 34 holds a quantity of catalyzed liquid thermosetting resin 36. By means of rollers 38 a bundle of reinforcing flexible fiber strands 32 can be pulled through the liquid 38 so that strands are completely saturated with the thermosetting resin.

FIG. 8 shows the bottom portion of a split cavity mold for use in forming a sucker rod according to the invention, the top portion having substantially the same appearance and the portions when joined together providing a mold cavity which defines the exterior surface of a completed sucker rod. The bottom half of the mold 42 is open and the bundle of strands 32 is placed in it. The top half of the mold 44 is then placed on the bottom half of the mold as shown in FIG. 10 while the strands 32 are kept under slight tension. The fibers 32 are flared at the ends, as shown in FIG. 9. Thereafter, a male flaring tool 46 is inserted into the open end of the mold formed by portions 42 and 44. The configuration of the male flaring tool or core 46 is of a helical thread form so as to conform closely to the portion of the mold cavity forming the male threads on the completed sucker rod. The flaring tool 46 serves to spread out the fibers so that they are positioned adjacent the cavity surface. The fibers having been saturated with liquid thermosetting resin retain their position adjacent the cavity peripheral surface and the male flaring tool 46 is retained in this position in the mold until the thermosetting resin has crosslinked and cured to a solid condition. After curing, the male flaring tool may be removed. The cavity left by the tool is either plugged or a casting resin used to fill the void, and/or the plug is left as a part of the rod.

In like manner, a female flaring tool 48 is inserted into the open end of the mold to closely conform to the interior female threaded configuration at the box end of the sucker rod. The female flaring tool 48 also accomplishes the purpose of spreading out the fiber strands so that the strands extend within the area adjacent the apex and root of the female threads. Additional plastic is added to the mold, pressure is applied, and circulation of heating fluid through piping 50 into the mold is accomplished as shown in FIG. 11.

After the resin in the mold has cured, the mold portions are separated, and the finished sucker rod 10 is removed, as shown in FIG. 12. The insert which forms the female threads 30 is removed. Thus, in this embodiment, the sucker rod is cast with its male and female threads without requiring machining operations to produce the threads. In this manner the reinforcing fibers are left intact so they impart full tensile strength throughout the full length of the rod, including the critical area of the threads.

In order to add additional strength to the box or female end, the cylindrical portion 24 may include addition circumferential wrapping of fibers or cloth (e.g. fiberglass) to provide radial strength.

The reinforcing fibers or roving 32 may be such as fiberglass, metal, aramid, carbon fibers, graphite fibers, boron fibers or mixtures of these fibers. Fiberglass cloth in the form of a tube can be used. The thermosetting resin of which the sucker rods may be formed and the resin in which the fibers are saturated as a step in the manufacture of the sucker rods, may be such as epoxy, polyester, vinylester, and the like. The temperature and pressure at which the resin systems is subjected during curing depends upon the nature of the plastic, and such is well known to those experienced in producing products from thermosetting plastics.

The completed sucker rod has substantial advantages over the known techniques of manufacturing sucker rods and particularly has greatly improved tensile strength in the male and female thread portions and complete corrosion protection from all liquids found in oil well production. Also, it eliminates the problem of electrolysis, and is of substantially lighter weight.

Pre-stressing of the fibers is an important aspect of the invention. This occurs, referring to FIGS. 10 and 11, by a pair of clamp or fiber retaining devices at each end of the mold 42–44 and generally indicated by the numerals 60 and 62. Each clamp includes a flange plate 64 having a curved central opening 66 which directs the fiber strands (roving) outward. A clamp plate 68 is attached to plate 64 by a plurality of threaded fasteners 70. The mold 42–44 is affixed and a tension force is applied as shown by the arrow 80 pulling the strands while or before the final cure of the resin.

FIG. 13 depicts a typical rod 102 having male threads at both ends. In the use a cylindrical coupling 106 shown in FIG. 14, includes internal female threads 110 and 112 to receive the respective male threads 102 and 104 of the connected rods. A wrench flat 116 may be provided on each side.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element or step thereof is entitled. For example, in the preferred embodiment the sucker rod is molded in its final configuration it is within the scope of the invention to mold the sucker rod in one or more stages. For instance, the basic rod 12 and threaded ends 14 and/or 16 can be molded first, then the upset portion 18 and wrench flats 20 are then molded on the rod separately.

Although a rounded or "knuckle" type thread form is shown and preferred, there are other screw-thread forms that are inclusive of the invention such as square, acme or standard thread forms.

What is claimed:

1. An elongated sucker rod having threaded ends and a substantially solid cross-section body therebetween, said rod comprised solely of curable plastic material having formed therein, prior to cure, a plurality of longitudinal fiber strands which have been pre-stressed and, said fiber strands in said solid body portion all lying substantially parallel to the longitudinal axis of said sucker rod, while the portions of said fibers adjacent said threaded ends follow the peaks and valleys of said threads in a longitudinal direction.

2. An improved sucker rod according to claim 1 which has a male threaded pin end portion at one end and a female threaded box end portion at the other end.

3. An improved sucker rod according to claim 1 wherein said threads are rounded threads.

* * * * *